United States Patent
Van Manen

(10) Patent No.: US 12,370,747 B2
(45) Date of Patent: Jul. 29, 2025

(54) METHOD AND SYSTEM FOR DETERMINING DYNAMIC PROPERTIES IN X AND Y PRINT DIRECTIONS OF AN FFF PRINTER USING CENTER LINE AND LINE WIDTH VARIATION ANALYSIS

(71) Applicant: Ultimaker B.V., Utrecht (NL)

(72) Inventor: Rijk Van Manen, Utrecht (NL)

(73) Assignee: Ultimaker B.V., Zaltbommel (NL)

( * ) Notice: Subject to any disclaimer, the term of this patent is extended or adjusted under 35 U.S.C. 154(b) by 526 days.

(21) Appl. No.: 17/770,073

(22) PCT Filed: Sep. 25, 2020

(86) PCT No.: PCT/NL2020/050590
§ 371 (c)(1),
(2) Date: Apr. 19, 2022

(87) PCT Pub. No.: WO2021/086174
PCT Pub. Date: May 6, 2021

(65) Prior Publication Data
US 2022/0396034 A1 Dec. 15, 2022

(30) Foreign Application Priority Data
Oct. 31, 2019 (NL) .................................. 2024127

(51) Int. Cl.
*B29C 64/393* (2017.01)
*B29C 64/118* (2017.01)
(Continued)

(52) U.S. Cl.
CPC .......... *B29C 64/393* (2017.08); *B29C 64/118* (2017.08); *B29C 64/209* (2017.08);
(Continued)

(58) Field of Classification Search
CPC ... B29C 64/393; B29C 64/118; B29C 64/209; B29C 64/236; B33Y 30/00; B33Y 50/02; B33Y 50/00; G01B 11/02; G01B 11/028
See application file for complete search history.

(56) References Cited

U.S. PATENT DOCUMENTS

2017/0050374 A1\* 2/2017 Minardi ................ B33Y 10/00
2018/0093420 A1 4/2018 Roberts et al.
(Continued)

FOREIGN PATENT DOCUMENTS

WO 2004024447 A2 3/2004

OTHER PUBLICATIONS

T.W. Ridler, Picture Thresholding Using an Iterative Selection Method, 1978, IEEE Transaction on Systems, Man, and Cybernetics, vol. SMC-8, No. 8, pp. 630-632 (Year: 1978).\*
(Continued)

*Primary Examiner* — Michael P LaPage
(74) *Attorney, Agent, or Firm* — N.V. Nederlandsch Octrooibureau

(57) ABSTRACT

A method of determining one or more printer properties of an FFF printer, comprising the steps of: a) depositing a pattern (1) of one or more lines on a support (2) using the FFF printer; b) making an image of the deposited pattern (1) on the support (2) using an imaging device; c) analysing one or more geometric features of the pattern (1) in the image; and d) determining the one or more printer properties of the FFF printer based the one or more geometric features.

16 Claims, 10 Drawing Sheets

(51) Int. Cl.
*B29C 64/209* (2017.01)
*B29C 64/236* (2017.01)
*B33Y 30/00* (2015.01)
*B33Y 50/02* (2015.01)
*G01B 11/02* (2006.01)

(52) U.S. Cl.
CPC ............ *B29C 64/236* (2017.08); *B33Y 30/00* (2014.12); *B33Y 50/02* (2014.12); *G01B 11/02* (2013.01)

(56) References Cited

U.S. PATENT DOCUMENTS

| | | | |
|---|---|---|---|
| 2018/0186082 A1* | 7/2018 | Randhawa | B33Y 50/02 |
| 2018/0297113 A1 | 10/2018 | Preston et al. | |
| 2018/0345583 A1* | 12/2018 | Leng | B29C 64/30 |
| 2018/0370124 A1* | 12/2018 | Kuo | B29C 64/386 |
| 2019/0009472 A1* | 1/2019 | Mark | B29C 64/393 |
| 2019/0054700 A1* | 2/2019 | Chandar | G06F 17/18 |
| 2020/0215761 A1* | 7/2020 | Chen | H04N 1/0005 |

OTHER PUBLICATIONS

Mingtao Wu, Detecting malicious defects in 3D printing process using machine learning and image classification, 2016, Proceedings of the ASME 2016 International Mechanical Engineering Congress and Exposition, pp. 1-6 (Year: 2016).*

* cited by examiner

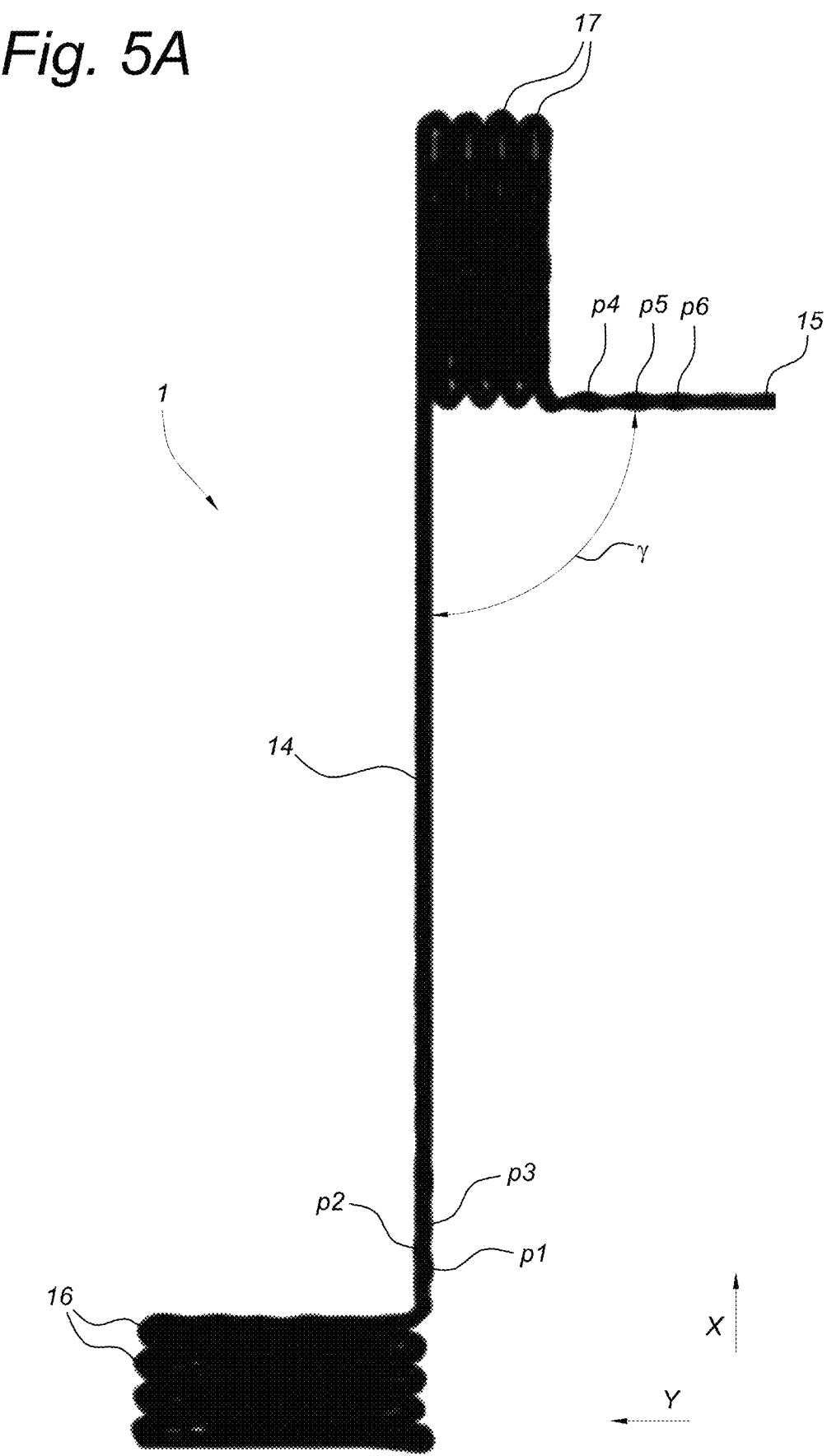

METHOD AND SYSTEM FOR DETERMINING DYNAMIC PROPERTIES IN X AND Y PRINT DIRECTIONS OF AN FFF PRINTER USING CENTER LINE AND LINE WIDTH VARIATION ANALYSIS

FIELD OF THE INVENTION

The present invention relates to a method of determining one or more printer properties of an FFF printer. The invention also relates to a system for determining one or more printer properties of an FFF printer. Examples of such properties are X/Y scaling and orthogonality, X/Y/Z dynamic properties, nozzle offset errors, and hysteresis.

BACKGROUND ART

US patent application US 2016/0059491 A1 discloses a method of compensating a coordinate offset of a print nozzle. This method is adapted for a three-dimensional printing apparatus that includes a platform, a first nozzle, and a second nozzle. The first nozzle is configured to feed a first forming material and the second nozzle is configured to feed a second forming material. The coordinate offset compensating method includes receiving a calibration model associated with a plurality of compensation parameters. Each of the compensation parameters corresponds to an offset value between the first nozzle and the second nozzle under a reference printing coordinate. The first nozzle and the second nozzle are controlled to print a testing three-dimensional object on the platform according to the calibration model. The testing three-dimensional object includes a plurality of correlation structures respectively corresponding to the compensation parameters, and each correlation structure includes a first sub-structure and a second sub-structure. The first sub-structure is formed of the first forming material, and the second sub-structure is formed of the second forming material. One of the compensation parameters, which corresponds to one of the correlation structures, is selected according to a joint level between the first sub-structure and the second sub-structure of the correlation structure. The reference printing coordinate of the first nozzle or the second nozzle is compensated according to one of the compensation parameters selected according to the testing three-dimensional object. In an embodiment the image capturing unit to capture an image of the testing three-dimensional object on the platform and identifies the joint level of each correlation structure through image processing and analysis.

Prior art methods such as described above for compensating nozzle offset requires a plurality of compensation parameters from which a best compensation parameter is selected that produces the best joint level between the first and second substructures. One problem with such a compensation method is that a plurality of compensation parameters need to be generated, which may or may not have be as relevant because of e.g. limited detailed knowledge of printer performance or behaviour.

SUMMARY OF THE INVENTION

The present invention aims to provide a method of determining printer properties of a Fused Filament Fabrication (FFF) printer. The method provides efficient and targeted analysis of various printer characteristics such as printer dynamics, orthogonality, scaling and offset errors, and hysteresis phenomena. As such, the method of the present invention provides comprehensive analysis for quantifying printer characteristics and behaviour in an efficient manner, thereby facilitating research, calibration and quality control of 3D printers.

According to the present invention, a method of determining one or more printer properties of an FFF printer is provided, the method comprises the steps of:
 a) depositing a pattern of one or more lines on a support using the FFF printer;
 b) making an image of the deposited pattern on the support using an imaging device to produce a scanned image of the pattern; and
 c) analysing one or more geometric features of the pattern in the scanned image; and
 d) determining one or more printer properties of the FFF printer using the one or more geometric features.

The above method allows for efficient and targeted analysis of printer properties by depositing the pattern on a support and subsequently making an image of the deposited line patterns using the imaging device. The obtained image is subsequently analysed for one or more geometric features of the deposited line pattern, wherein the one or more geometric features are indicative of specific printer behaviour. So, by choosing the pattern in a particular way allows specific printer properties/behaviour to be determined efficiently, thereby gaining further knowledge for improving calibration and quality control of the printers.

In an embodiment, the support is a build plate of the FFF printer. In this embodiment, the pattern is printed directly on the build plate. Alternatively or additionally, (part of) the pattern may be printed on a surface of a printed object.

Preferably, the pattern is a single line pattern. This results in a fast and simple process. However, it is noted that additional layers can be deposited on the first layer.

The imaging device may be an external imaging device external from the FFF printer. Examples of such devices are optical scanners, such as flatbed scanners, or the imaging device could comprise external cameras, or cameras built into other equipment such as mobile phones. Alternatively, the imaging device may be built into the FFF printer itself. An example of such an embodiment is a camera arranged in the build chamber of the printer, or an optical scanner built into the printer. It is conceivable that a flatbed scanner is arranged just below a transparent build plate.

In an embodiment, the pattern may, but need not, be chosen as a pattern of one or more connected or disconnected lines, each of which target specific printer behaviour through one or more geometric features of interest.

In an exemplary embodiment, the step of d) determining the one or more printer properties may comprise determining orthogonality of X and Y print axes; scaling errors in X and Y print directions; dynamic properties in X and Y and Z print directions; X and Y offset errors between a plurality of print nozzles of the FFF printer; and/or hysteresis of print head movements. All these printer properties indicate specific performance and behavioural aspects of an FFF printer, and as such reveal quality levels thereof.

When the obtained image is analysed for the one or more geometric features of interest, it may be the case that an image of the pattern lacks sufficient quality for accurately analysing the one or more geometric features. This may happen when, for example, an optical scanner produces scanned images having a relatively low feature resolution and definition. To facilitate accurate image analysis, an embodiment is provided wherein the method further comprises the step of increasing contrast of the image prior to the step of analysing the one or more geometric features.

Improving contrast improves definition of e.g. edges of the pattern of lines in the image and as such the one or more geometric features will be easier to detect accurately.

It is further worth noting that imaging device itself need not be manufactured accurately as a result of which an imaging device could introduce a large variety of unwanted imaging errors, distortions, inaccuracies etc. in the image. For example, a printed straight line on the support may be somewhat bent/distorted in the image because of mechanical and/or electronic errors introduced by the imaging device.

To minimize adverse effects of mechanical and/or electronic inaccuracies of an imaging device, there is provided an embodiment wherein the method further comprises the step of making an image of a reference pattern using the imaging device to produce a reference image, and subsequently determining an imaging error map between the reference pattern and the reference image. The method then continues by compensating the image of the pattern for imaging errors based on the imaging error map.

So, by making an image of a predefined reference pattern, various scanning errors, distortions, inaccuracies etc. between the scanned reference image and the reference pattern can be collected and turned into an imaging error map. This imaging error map, in turn, allows the scanned image of the pattern to be compensated such that the various errors introduced by the imaging device are removed. A particularly attractive advantage of this embodiment is that it is not required to utilize an expensive, high-end, high resolution imaging device for achieving accurate analysis of the one or more geometric features. So even though an inexpensive, low-end imaging device with sufficient resolution may introduce more scanning errors than an expensive, high-end, high resolution imaging device, obtaining an imaging error map as outlined above still allows for accurate analysis of the one or more geometric features regardless of the imaging device used.

SHORT DESCRIPTION OF DRAWINGS

The present invention will be discussed in more detail below, with reference to the attached drawings, in which FIG. 1 shows a plan view of a pattern of lines for determining printer properties of an FFF printer according to an embodiment of the present invention;

FIG. 5A shows a line pattern for determining dynamic properties in X and Y print directions according to an embodiment of the present invention;

FIG. 11 shows an imaging error map according to an embodiment of the present invention, and wherein

DESCRIPTION OF EMBODIMENTS

Figure 1:
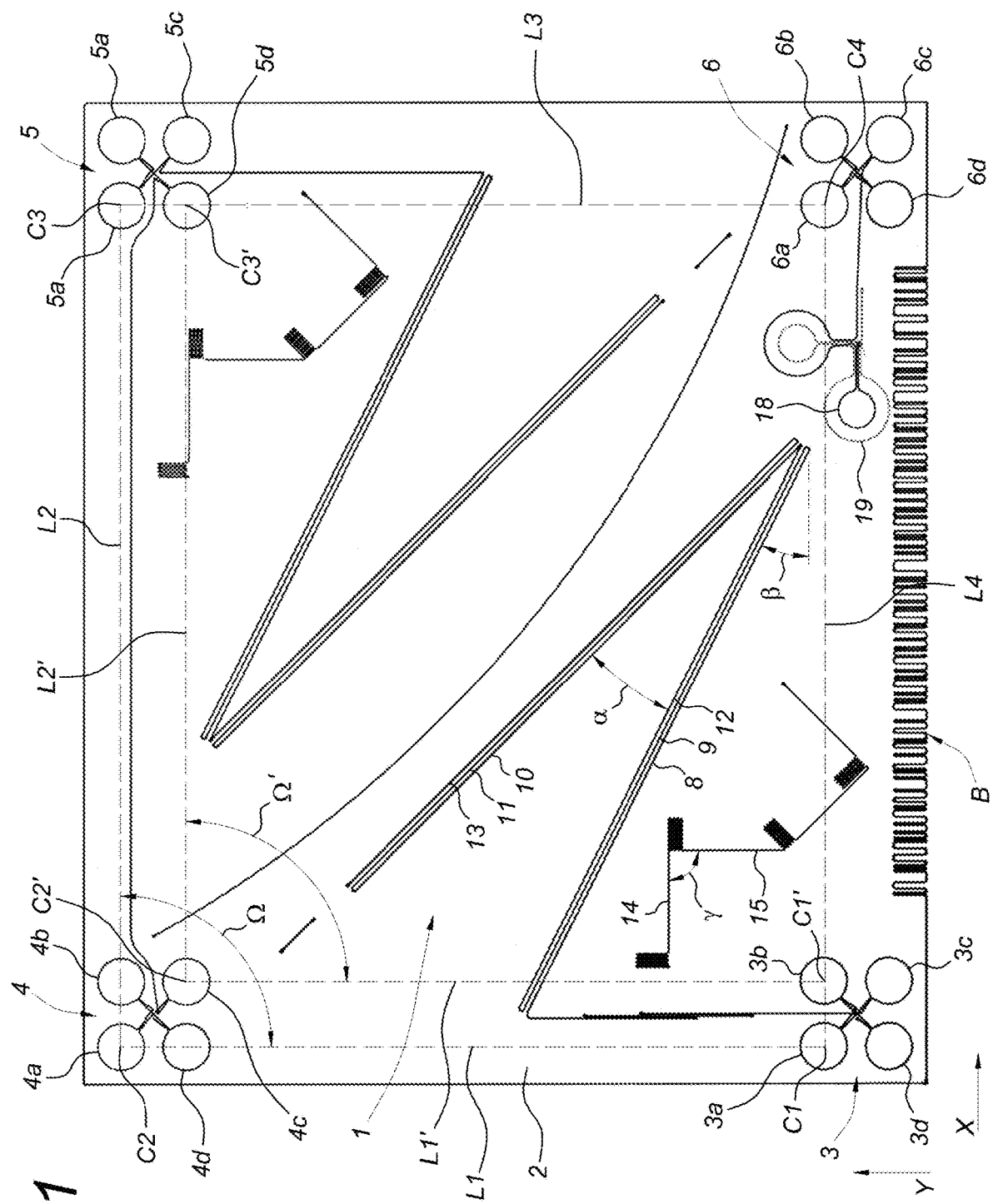
Figure 2:
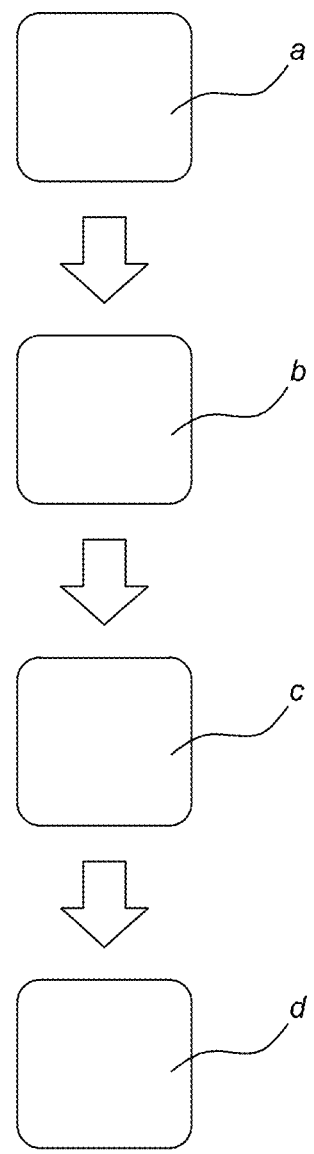
FIG. 2 shows a method of determining printer properties of an FFF printer according to an embodiment of the present invention.

According to an embodiment of the present invention, FIG. 1 shows a plan view of a pattern 1 of lines deposited on a support 2 e.g. a build plate 2, by an FFF printer (not shown). In an exemplary embodiment the support 2 is square or rectangular. As will be detailed further herein below, the pattern 1 of deposited print material in the form of one or more lines allows various printer properties to be determined by the method of the present invention, wherein FIG. 2 shows a graphical representation of the method of determining such printer properties of the FFF printer.

As depicted, the method comprises the steps of a) depositing a pattern 1 of one or more lines on a support 2 using an FFF printer. That is, in this step an FFF printer is used to deposit a of printable material, e.g. extruding a filament material onto on the support 2.

Once the pattern 1 has been deposited, the method continues and comprises the step of b) making an image of the deposited pattern 1 on the support 2 using an imaging device. In this step the support 2 may, for example, be removed from the FFF printer and arranged on the imaging device, e.g. a flatbed scanner to scan the pattern 1. As will be discussed in further detail later, it is also conceivable that the imaging device, e.g. a camera, is integrated into the FFF printer and the support 2 with the deposited pattern 1 can remain in the FFF printer.

When the image of the pattern 1 has been obtained, the method continues with the step of c) analysing one or more geometric features of the pattern 1 in image. In this step the one or more lines in the scanned image comprise one or more geometric features of interest. Here, in this step analysing the one or more geometric features may also be construed as "extracting" one of more geometric features of interest from the scanned image.

Once the one or more geometric features have been analysed/extracted from the scanned image, the method proceeds with the step of d) determining one or more printer properties of the FFF printer based on using the one or more geometric features.

The method steps a) to d) allow for efficient and targeted determination of printer properties by depositing the pattern 1 on the support 2 and subsequently making an image of the deposited line pattern 1 using the imaging device. This scanned image is subsequently used for analysing/extracting one or more geometric features of the pattern 1 in the scanned image. The one or more geometric features can be seen as markers or indicators of specific printer behaviour. So, by choosing the pattern 1 in a particular way allows targeted determination of specific printer properties and behaviour of interest. Knowledge of these printer properties not only facilitates quality control of 3D printers, e.g. before the printer is shipped to customers, but specific printer behaviour may also be used for calibration purposes as specific printer behaviour may identify design errors/perturbations of the FFF printer.

Since the method may be performed on various FFF printers and for a large number of patterns 1, it is advantageous to efficiently tag and identify a large numbers of image scans of patterns 1 as well as the various FFF printers with which the patterns were printed. To that end an embodiment is conceivable wherein the step of a) depositing the pattern 1 further comprises depositing a sequence of lines along an edge of the support 2 representing a bar code B, thereby tagging the deposited pattern 1 and linking it with a particular FFF printer with which the pattern 1 was printed.

There are various printer properties that may be of interest, for example, in an embodiment, the step of d) determining the one or more printer properties may comprise determining one or more of orthogonality of X and Y print axes, e.g. determining "squareness" of X-Y print axes;

scaling errors in X and Y print direction, e.g. determining to what extend do predefined distances in a 3D computer model match real distances printed by the FFF printer;

dynamic properties of the FFF printer in X, Y and Z print directions, e.g. eigenmodes and their corresponding eigenfrequencies and damping of the printer head;

hysteresis of print head movements, e.g. determine backlash in mechanical parts of the FFF printer.

The above-mentioned properties of the FFF printer determine to a certain extend the accuracy at which an FFF printer is able to print a 3D model as specified. These properties also provide further information as to what part(s) of the FFF printer may require further design or manufacturing improvements, as well as providing information for calibration purposes.

Referring to FIG. 1, the orthogonality of X and Y axes may be determined by considering the following embodiment, wherein the step of a) depositing the pattern 1 further comprises depositing a first 3, a second 4 and a third 5 line pattern. The first 3 and second 4 line patterns are spaced apart in a Y direction, and the second 4 and the third 5 line patterns are spaced apart in an X direction, and wherein the first 3 and the third line 5 patterns are spaced apart in both the Y and X direction.

This embodiment then continues with step of c) analysing one or more geometric features wherein two straight lines are analysed/determined, i.e. a first straight line L1 extending between geometric centres C1, C2 of the first 3 and the second 4 line patterns, and a second straight line L2 extending between geometric centres C2, C3 of the second 4 and the third 5 line pattern.

Then based on the first and second straight lines L1, L2, the step of d) determining one or more printer properties comprises determining orthogonality of X and Y printer axes based on the first and second straight line L1, L2.

In this embodiment each of the line patterns 3, 4, 5 may be chosen to allow for accurate determination of geometric centres thereof, or other readily identifiable points of the line patterns 3, 4, 5, such as corners, line crossings and the like. Once the geometric centres or other points of interest are identified in the scanned image, the straight lines L1, L2 can be determined and their orthogonality to one another analyses. As will be understood, the first, second and third line patterns 3, 4, 5 are deposited according to a model so that the resulting first and straight lines L1, L2 should be orthogonal/perpendicular. Analysis of the straight lines L1, L2 in the scanned image will then reveal any deviations from the intended orthogonality in the model. That is, the depicted angle Ω between the first and second straight lines L1, L2 may deviate from a perfect 90° degree angle and a such indicate/reveal the severity of non-orthogonal X and Y print axes of the FFF printer.

For example, an exemplary FFF printer may comprise a nozzle head arranged on a gantry which is adapted to allow for movements of the nozzle head in X and Y directions that are perpendicular to each other. However, manufacturing errors and offsets of the gantry may not allow for perfect orthogonal movements of the nozzle head as intended. The angle Ω between the first and second straight lines L1, L2 as determined from the scanned image allows such manufacturing errors and offset of the gantry to be identified.

As further depicted in FIG. 1, the first 3, second 4, and third 5 line patterns may each comprise one or more circles and/or polygons. Such circles and/or polygons allow geometric centres thereof to be conveniently and accurately determined from the scanned image, and so in turn the first and second straight lines L1, L2 can be readily determined from the scanned image. For example, the first 3, second 4 and third 5 line patterns may each comprise an array arrangement of spaced apart circles and/or polygons, to facilitate and simplify systematic determination of geometric centres from the scanned image.

In the exemplary embodiment shown in FIG. 1, each of the first 3, second 4 and third 5 line patterns comprises an array arrangement of a plurality of spaced apart circles, e.g. so where the first line pattern 3 comprises a plurality of circles 3*a*, 3*b*, 3*c*, 3*d*, the second line pattern 4 comprises a plurality of circles 4*a*, 4*b*, 4*c*, 4*d*, and wherein the third line pattern 5 comprises a plurality of circles 5*a*, 5*b*, 5*c*, 5*d*. The geometric centres of each of these circles may be analysed as well as a plurality of straight lines in Y direction and a plurality of straight lines in X direction extending between these geometric centres. For example, in FIG. 1 it is shown that further first and second straight lines L1', L2' may be analysed that extend between the further geometric centres C1', C2', and C3' of circles 3*b*, 4*c*, 5*d*. From these further first and second straight lines L1', L2' the orthogonality of X and Y print axes may be determined by analysing a further angle Ω' between the further first and second straight lines L1', L2' respectively.

As further shown, in an embodiment the first, second and third line patterns 3, 4, 5 may be deposited near or at corners of the support 2, thereby ensuring that a nozzle head must travel into the corners so that orthogonality of the X and Y print axes, and so orthogonality of the gantry, can be investigated over a complete workspace of the FFF printer.

In an even further embodiment, it would be possible to deposit a fourth line pattern 6 spaced apart in Y direction from the third line pattern 4, spaced apart in X direction from the first line pattern 3 and spaced apart in X and Y direction from the second line pattern. A third straight line L3, see FIG. 1, may then be drawn between a geometric centre C4 of the fourth line pattern 6 and the geometric centre C3 of the third line pattern 5 as discussed earlier.

Then based on e.g. the second and third straight lines L2, L3, the step of d) determining one or more printer properties comprises determining orthogonality of X and Y printer axes based on the second and third straight line L2, L3. Furthermore, in other embodiments it is conceivable to investigate the accuracy at which parallel lines can be generated based on the first and third straight lines L1, L3.

Like the first, second and third line patterns 3, 4, 5, the fourth line pattern 6 may comprise a plurality of circles and/or polygons, e.g. a plurality of spaced apart circles 6*a*, 6*b*, 6*c*, 6*d*, possibly in an array arrangement as depicted.

From FIG. 1 it is also shown that such four line patterns 3, 4, 5, 6, may be deposited at each corner of the support 2, so that orthogonality of the X and Y print axes can be determined over a largest workspace of the FFF printer, e.g. the gantry.

Another interesting printer property of interest is related to scaling errors in X and Y directions, which refers to a difference that may occurs between a specified length of a line to be printed and the actual length printed by the FFF printer.

Figure 3:
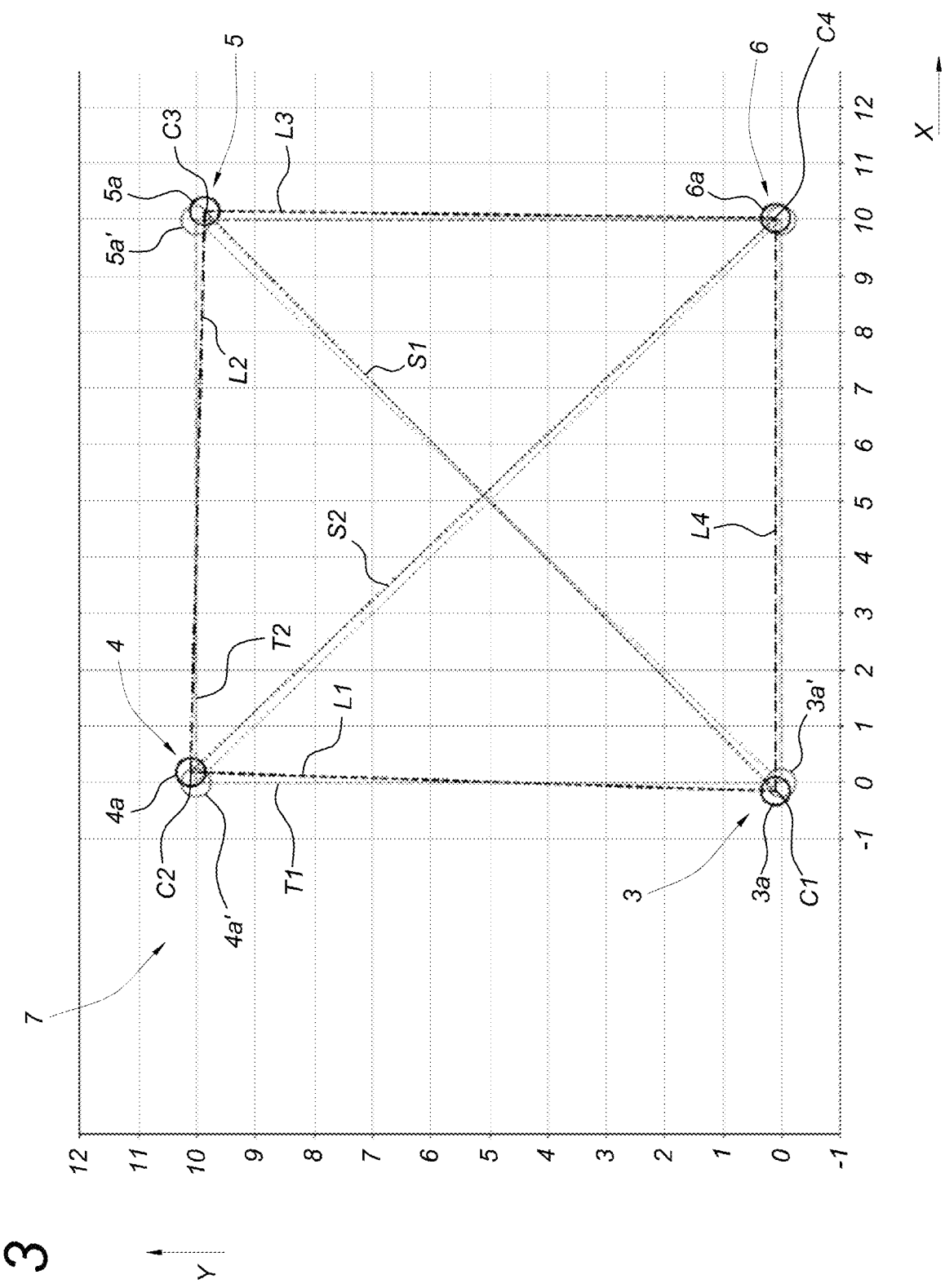
FIG. 3 shows a line pattern for determining scaling errors in X and Y print directions according to an embodiment of the present invention.

Such scaling errors may be explained by referring to FIG. 3, showing an embodiment of an array line pattern 7 for determining scaling errors in X and Y print directions. As shown, the array line pattern 7 may be obtained according to the embodiment of the method as outlined above. That is, by depositing the first 3, the second 4 and the third 5 line pattern, wherein the first 3 and second 4 line patterns are spaced apart in a Y direction, wherein the second 4 and the third 5 line patterns are spaced apart in an X direction, and wherein the first 3 and the third line 5 patterns are spaced apart in the Y and X direction.

This embodiment then continues with the step of c) analysing one or more geometric features wherein two straight lines L1, L2 are drawn, i.e. the first straight line L1 extending between geometric centres C1, C2 of the first 3 and the second 4 line patterns, and a second straight line L2 extending between geometric centres C2, C3 of the second 4 and the third 5 line pattern.

Based on the first and second straight lines L1, L2, the step of d) determining one or more printer properties then comprises determining a scaling error in the X and Y print direction based on the first and the second straight line L1, L2.

As shown, in an embodiment each of the first, second and third line patterns 3, 4, 5 may comprise a respective circle 3a, 4a, 5a allowing the geometric centres C1, C2, C3 thereof to be readily determined from the scanned image as well as the straight lines L1, L2 between the geometric centres C1, C2, C3.

From the first and the second straight line L1, L2 it is then possible to determine scaling errors in the X and Y direction as differences between lengths DL1, DL2 of the first and second straight line L1, L2 and what these lengths should be according to a model used as input to the FFF printer.

In particular, in an embodiment a Y scaling error may be seen as a difference between a length DT1 of a prescribed first straight target line T1 and a length DL1 of the first straight line L1.

Likewise, in an embodiment an X scaling error may be seen as a difference between a length DT2 of a prescribed second straight target line T2 and a length DL2 of the second straight line L2.

So, by comparing lengths DL1, DL2 of the first and second straight lines L1, L2 to the respective lengths DT1, DT2 of the first and second straight target lines T1, T, scaling errors in the X and Y print directions may be determined.

As further shown, the first and second straight target lines T1, T2 may be viewed as extending between geometric centres of prescribed circles 3a', 4a', 5a'.

For further determining X and Y scaling errors, there is provided an embodiment wherein the fourth line pattern 6 is deposited, e.g. as a circle 6a, and the third straight line L3 may then be analysed between geometric centre C4 of the fourth line pattern 6 and the geometric centre C3 of the third line pattern 5. Furthermore, a fourth straight line L4 may be analysed between the geometric centre C4 of the fourth line pattern 6 and the geometric centre C1 of the first line pattern 3.

According to an embodiment, the step of d) determining the one or more printer properties may then comprise determining scaling errors in the X and Y print directions based on the first, second, third, and fourth straight lines L1, L2, L3, L4.

In particular, in an exemplary embodiment the Y scaling error may be determined by determining a mean Y length, MY, of lengths DL1, DL3 of the first and third straight line L1, L3 and dividing this mean Y length, MY, by the length DT1 of the first straight target line T1.

The X scaling error may likewise be determined by determining a mean X length, MX, between lengths DL2, DL4 of the second and fourth straight line L2, L4, and dividing this mean X length, MX, by the length DT2 of the second straight target line T2.

In an even further embodiment, a first diagonal line S1 is drawn between the first and the third line pattern 3, 5, e.g. between geometric centres C1, C3. Also, a second diagonal line S2 is drawn between the second and the fourth line pattern 4, 6, e.g. between geometric centres C2, C4. Then a squareness scaling error may be determined as the square root of $(DL1^2+DL2^2)$ divided by a length DS1 of the first diagonal line S1. Likewise, a squareness scaling error may be determined as the square root of $(DL1^2+DL4^2)$ divided by a length DS2 of the second diagonal line S2.

It is worth nothing that distances between the various line patterns 3, 4, 5, 6 can in principle be chosen arbitrarily to determine scaling errors over small but also over large distances. For large distances an exemplary embodiment would be that each of the line patterns 3, 4, 5, 6 is arranged in a corner of the support 2.

Figure 4A:
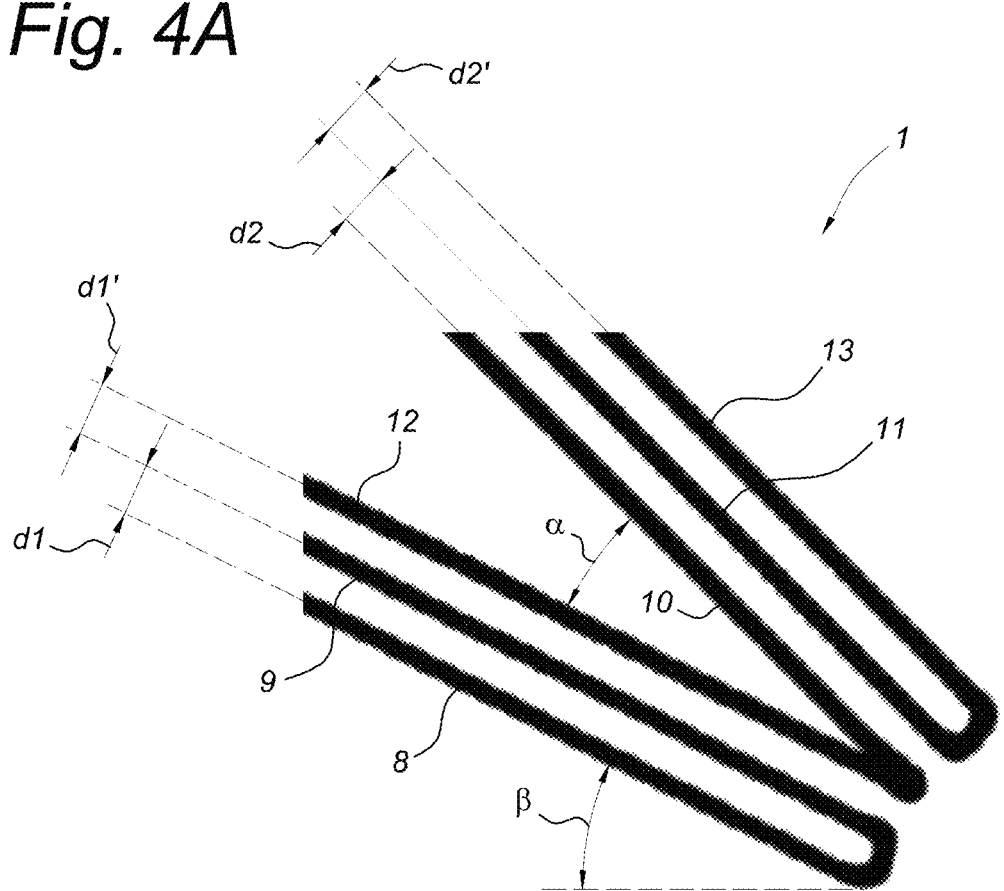
FIG. 4A shows a line pattern for determining hysteresis of printer movements according to an embodiment of the present invention.

To continue with other properties of the printers, the method of the present invention further allows hysteresis to be examined for print head movements. To that end an embodiment is provided wherein the step of a) depositing the pattern 1 comprises depositing a first set of two spaced apart parallel lines 8, 9 and a second set of two spaced apart parallel lines 10, 11, wherein the first set of lines 8, 9 and the second set of lines 10, 11 are at an angle $\alpha$ between 0° and 90° with respect to each other. FIG. 4A shows the lines 8, 9, 10, 11, 12 and 13 of FIG. 1 in more detail. The first set of lines 8, 9 are at an angle $\beta$ between 0° and 90° with respect to the X-axis/direction. A distance between line 8 and line 9 is referred to as d1 and a distance between line 10 and line 11 is referred to as d2. The distances d1 and d2 are taken using center lines of the printed lines 10 and 11.

Figure 4B:
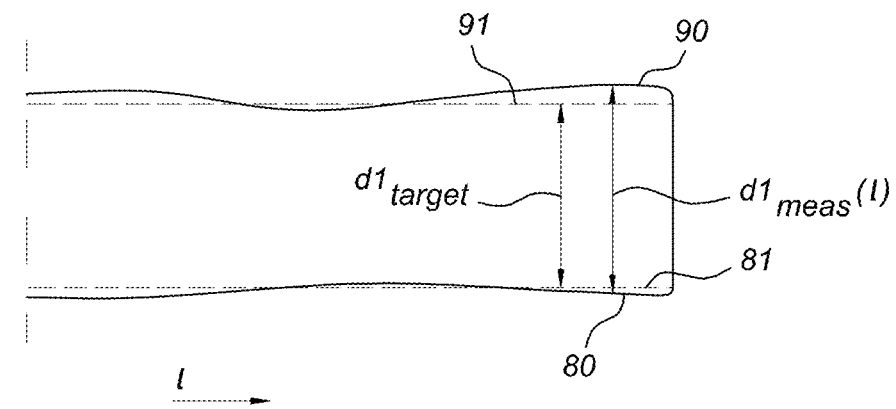
FIG. 4B shows a detailed view of a part of FIG. 4A.

FIG. 4B shows a detailed view of a part of FIG. 4A. In FIG. 4B the center lines 80, 90 of the printed lines 8, 9 are shown. Also, the intended lines, referred to as target lines 81 and 91 are indicated using dotted lines. It is noted that the distances d1 and d2 are not constant and that these distances will vary as a function of the printing distance. For this reason, below the distance is indicated as d1($l$) with l being a value in the print direction of the lines 8 and 9. In FIG. 4B the distance $d1_{target}$ is the target distance between the center lines 81 and 91, i.e. the distance defined by the printing instructions.

Once d(1) is measured along the length of the lines 8 and 9, d(1) is known and can be used in the following formula:

$$(d1_{meas}(l)) - d1_{target}) = e1(l), \text{ where } e1(l) \text{ is the local distance error between the lines 8 and 9.}$$

Similar measuring steps are performed to determine a further local distance error using the second distance $d2(l)$ between the two lines 10, 11 of the second set of lines. This may result in;

$$(d2_{meas}(l))-d2_{target})=e2(l), \text{ where } e2(l) \text{ is the local distance error between the lines 10 and 11.}$$

Subsequently, the step of d) determining one or more printer properties comprises determining hysteresis of print head movements based on a function H of the first and second local distance errors, i.e. $H(e1(l),e2(l))$.

In a group of exemplary embodiments, the function H of the first and local second distance error e1, e2, may be:
- a maximum of the first and second local distance error $e1(l)$, $e2(l)$, e.g. max(e1(l), e2(l)); or
- a square root of the sum of squares of the maximum values of $e1(l)$ and $e2(l)$, e.g. $H(e1(l),e2(l))= \sqrt{e1m^2+e2m^2}$, with e1m equal to max(e1(l)) and e2m=max(e2(l)), or
- functions $f1(\alpha)$, $f2(\beta)$ of the angles $\alpha$ and $\beta$, e.g. $H(e1,e2)=f1(\alpha)*e1m+f2(\beta)*e2m$.

Through this embodiment, it is possible to observe inaccuracies of printer head movements due to hysteresis as a function of the direction in which the printer head moves.

As with the printer properties referred to earlier, the first and second distance errors $e1(l)$, $e2(l)$ can be accurately observed and determined from the scanned image of the first set of lines 8, 9 and the second set of lines 10, 11.

For further accuracy of observed hysteresis phenomena, an embodiment is conceivable wherein the previous steps are performed using three spaced apart parallel lines. FIG. 4A shows the additional lines used, see lines 12 and 13. From these lines the distances d1' and d2' can be analysed similar to the analysis mentioned above. The hysteresis of printer movements may then be determined based on a the first, second, third and fourth distances $d1(l)$, $d1'(l)$, $d2(l)$, $d2'(l)$ with l the location along the print path of the lines.

According to the present invention, the scanned image of the pattern 1 can also be used to determine dynamic properties and behaviour of an FFF printer, such as eigenmodes of a printer head for example. In light of this, FIG. 5A shows a line pattern for determining dynamic properties in X and Y print directions according to an exemplary embodiment of the present invention.

FIG. 5A shows a detailed part of the pattern of FIG. 1. Please note that FIG. 5A is 90° rotated as compared to FIG. 1, so as to be able to focus on details of lines 14, 15, 16 and 17. As shown, in this embodiment of the method, the step of a) depositing the pattern 1 comprises depositing a first line 14 and a subsequent second line 15 at an angle γ between 0° and 180° degrees to the first line. In this example the angle γ is 90°.

In this embodiment the step of c) analysing one or more geometric features comprises localizing perturbations p4, p5, p6 at the beginning of the second line 15, and determining a centre line of the perturbations, and determining line width variations of the perturbations.

The step of d) determining one or more printer properties then comprises determining dynamic properties in X and Y print directions based on an oscillation of the center line and the line width variations.

The perturbations p4, p5, p6 of the second line 15 reveal a dynamic mode of oscillation of e.g. the print head of the FFF printer, or of the motion system of the FFF printer. In the embodiment shown in FIG. 5A, the first line 14 is preceded by a pattern 17 to excite the motion system. The beginning of the first line 14 reveals that the print head oscillates whilst moving along the X-direction when depositing the first line 14.

Figure 5B:
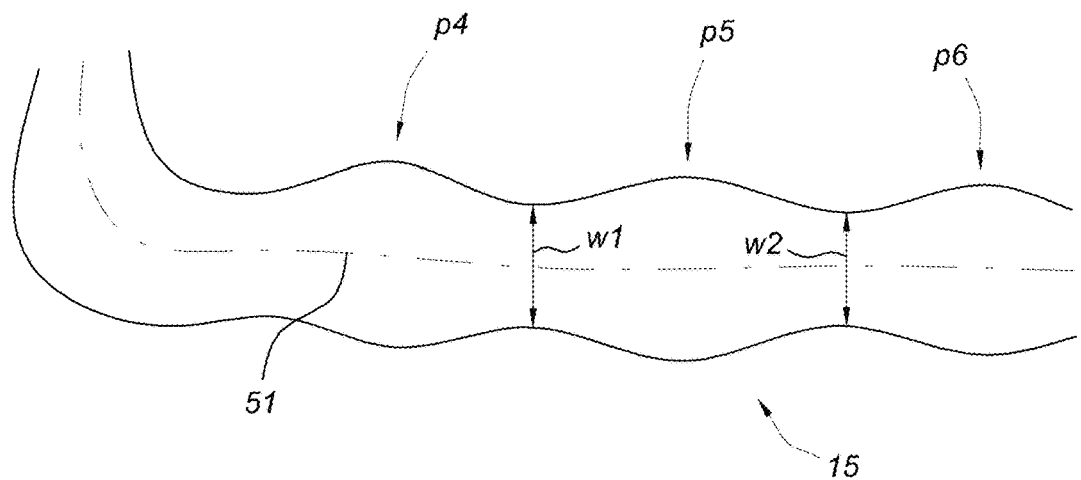
FIG. 5B shows a zoomed in part of the FIG. 5A.

FIG. 5B shows a zoomed in view of the perturbations p4, p5 and p6. When analysing the perturbations, first a center line 51 is determined. As can be seen from FIG. 5B, the center line 51 may have an oscillatory behaviour. Next to the phenomena of this meandering center line, a width w1, w2 of the line 15 may vary in the printing direction, i.e. w1≠w2. Variations in width may be due to an oscillation of the print head in a direction parallel to the printing direction. Such an oscillation will avoid the print head from printing a constant line width due to variations in speed of the nozzle relative to the support.

By analysing the perturbations p4, p5, p6 and the line width variations w1, w2, the eigenmode can be identified. To further enhance the analysis, perturbations p1, p2 and p3 in the line 14 can analysed. The angle γ between line 14 and 15 can be chosen to identify particular shapes of the eigenmodes under investigation. In this particular embodiment the angle γ is approximately 90° degrees so that the first and second lines 14, 15 are substantially orthogonal.

It is worth noting that the perturbations p1, p2, p3, p4, p5 and p6 reveal eigen frequencies, of the FFF printer, such as eigen frequencies of the gantry for example. By analysing the shape of the perturbations (i.e. are they variations in line width or in the center line) information on the eigenmode is acquired, and by analysing the distance between p4, p5 and p6 and/or w1 and w2, the eigen frequencies can be determined.

As further shown in FIG. 5A, the first straight line 14 may be preceded by a first meandering start section 16 substantially perpendicular to the first straight line 14. Likewise, the second straight line 15 may be preceded by a second meandering start section 17 substantially perpendicular to the second straight line 15. By printing these meandering sections 16, 17 the printer motion system is excited just before printing the lines 14 and 15. This will result in more noticeable perturbations. Furthermore, the meandering sections 16, 17 will increase adhesion of the filament material to the support 2 so as to avoid unwanted detachment of the material.

Figure 6:
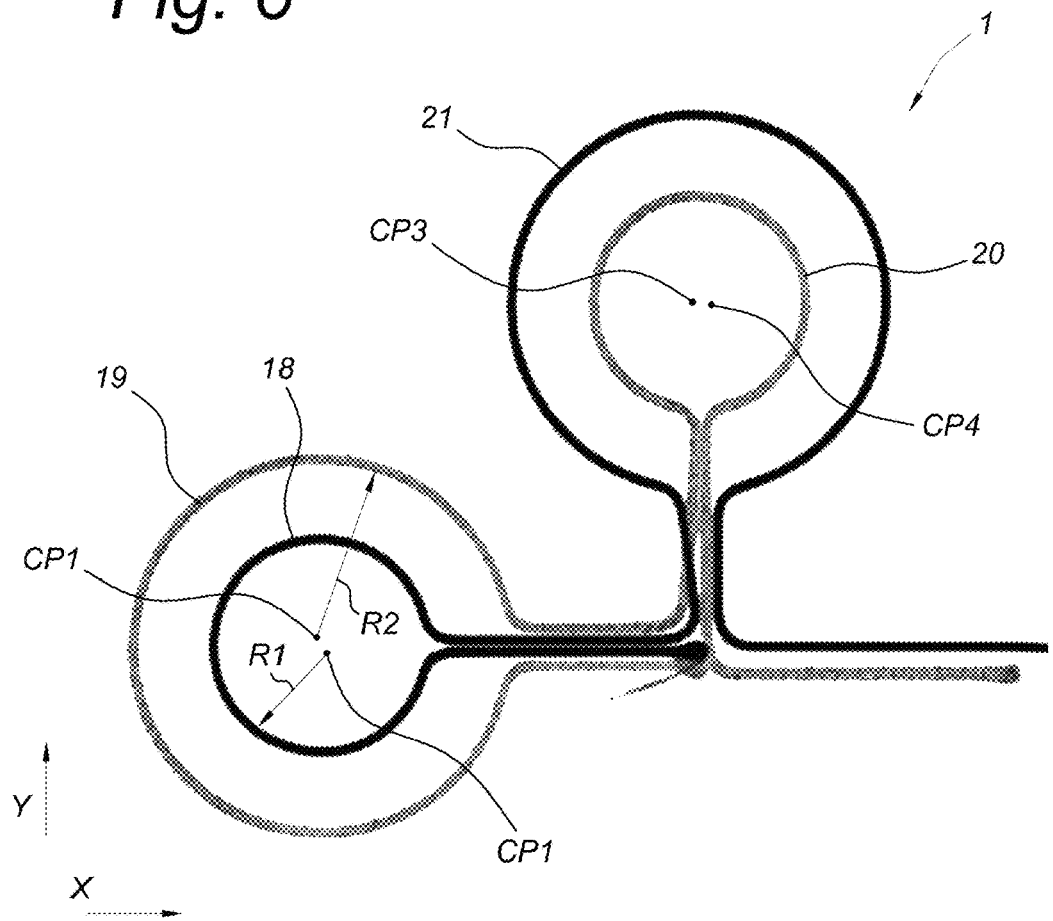
FIG. 6 shows a line pattern for determining X and Y offset errors between a plurality of nozzles according to an embodiment of the present invention.

Many 3D printers, such as FFF printers, comprise a print head provided with one or more nozzles capable of printing different materials, colours etc. However, small manufacturing tolerances may be present, and the nozzles may not be perfectly aligned with one another. To identify misalignment and positional offset of two nozzles, the method of the present invention can be utilized by considering a pattern 1 as shown in FIG. 6.

In particular, according to an embodiment the step of a) depositing the pattern 1 may further comprise depositing a first circle 18 with a first nozzle (not shown) and a second circle 19 with a second nozzle (not shown), the second circle 19 being larger than the first circle 18 as well as being concentric thereto.

It is worth mentioning that in this step the first and second circles 18, 19 are intended to be concentric as specified in a predefined model. Also, as depicted, the second circle 18 has a larger radius R2 than a radius R1 of the first circle 18.

The step of c) analysing the one or more geometric features then comprises analysing/identifying, i.e. in the scanned image, a first and second centre point CP1, CP2 of the first and second circle 18, 19 respectively.

Subsequently, the step of d) determining one or more printer properties then comprises determining X and Y offset error between the first and the second nozzle based on the first and second centre points CP1, CP2.

In this embodiment, the first and second circles 18, 19 allow the first and second centre points CP1, CP2 to be conveniently located and accurately analysed in the scanned image of the pattern 1. Once the first and second centre points CP1, CP2 have been identified, the offset between the centres point CP1, CP2 can be determined, which is a measure of the X and Y offset between the first and the second nozzle.

Is noted that the above embodiment may also be considered in view of polygons instead of the first and second circles 18, 19. In particular, according to an alternative embodiment, the step of a) depositing the pattern 1 may further comprise depositing a first polygon (not shown) with a first nozzle (not shown) and a second polygon (not shown) with a second nozzle (not shown), the second polygon being larger than the first polygon as well as being concentric thereto.

It is worth mentioning that in this step the first and second polygons are intended to be concentric as specified in a predefined model. The first and second polygons may, but need not, have identical shapes. The step of c) analysing the one or more geometric features then comprises analysing/identifying, i.e. in the scanned image, a first and second centre point of the first and second polygon respectively.

Subsequently, the step of d) determining one or more printer properties then comprises determining X and Y offset between the first and the second nozzle based on the first and second centre points.

To further increase accuracy of the X and Y offsets between a plurality of print nozzles of the FFF printer, it is of course conceivable to deposited a third circle 20 with the first nozzle (not shown) and a fourth circle 21 with the second nozzle (not shown), wherein the fourth circle 21 being larger than the third circle 20 as well as being concentric thereto. The step of step of c) and d) are then performed analogously as outlined above with regard to analysed/identified third and fourth centre points CP3, CP4 of the third and fourth circles 20, 21 respectively, and determining X and Y offset between the first and the second nozzle based on the third and fourth centre points CP2, CP3. Then the X and Y offset between the first and the second nozzles could be determined by, for example, taking the mean of the offset determined based on the first and second centre points CP1, CP2, and the offset determined based on the third and fourth centre points CP3, CP4.

According to the present invention, one or more geometric features of the deposited pattern 1 in the scanned image are analysed, so that one or more printer properties can be determined based on these geometric features. From this it is readily evident that image quality of the scanned image must be sufficient to accurately identify these geometric features.

In an embodiment the method further comprises increasing contrast of the scanned image prior to the step of analysing the one or more geometric features. That is, once a scanned image of the pattern 1 is available as a result of method step b), then this scanned image may be improved by increasing contrast of the scanned image prior to the step of c) analysing the one or more geometric features. According to this embodiment, increasing contrast allows for enhanced definition of the pattern 1 in that the one or more lines in the scanned image are easier to identify and non-relevant areas are disregarded from further processing.

Figure 7:
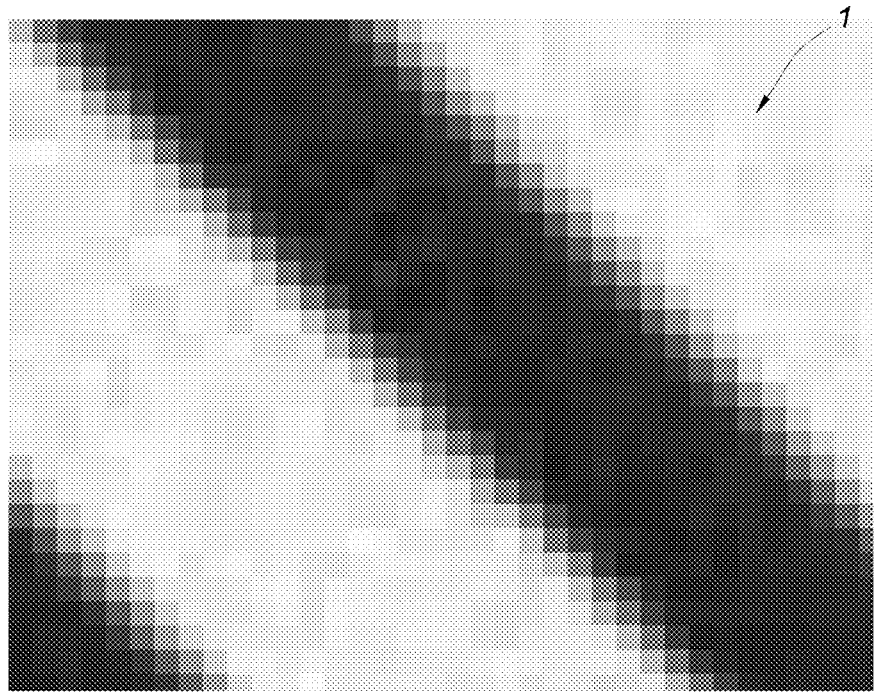
FIG. 7 shows a magnified portion of a scanned image according to an embodiment of the present invention.
Figure 8:
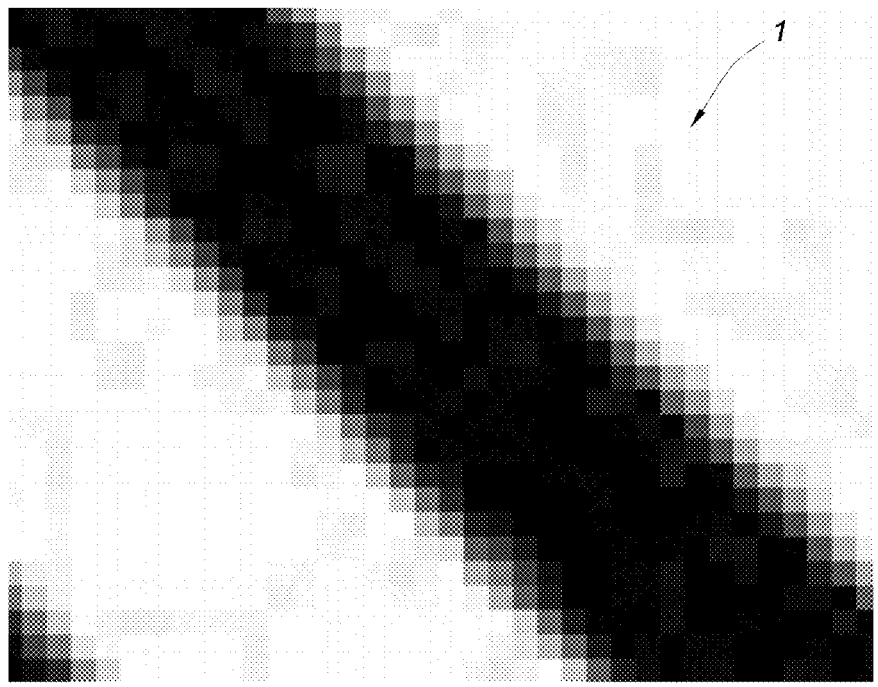
FIG. 8 shows a magnified portion of a contrast modified scanned image according to an embodiment of the present invention.
Figure 9:
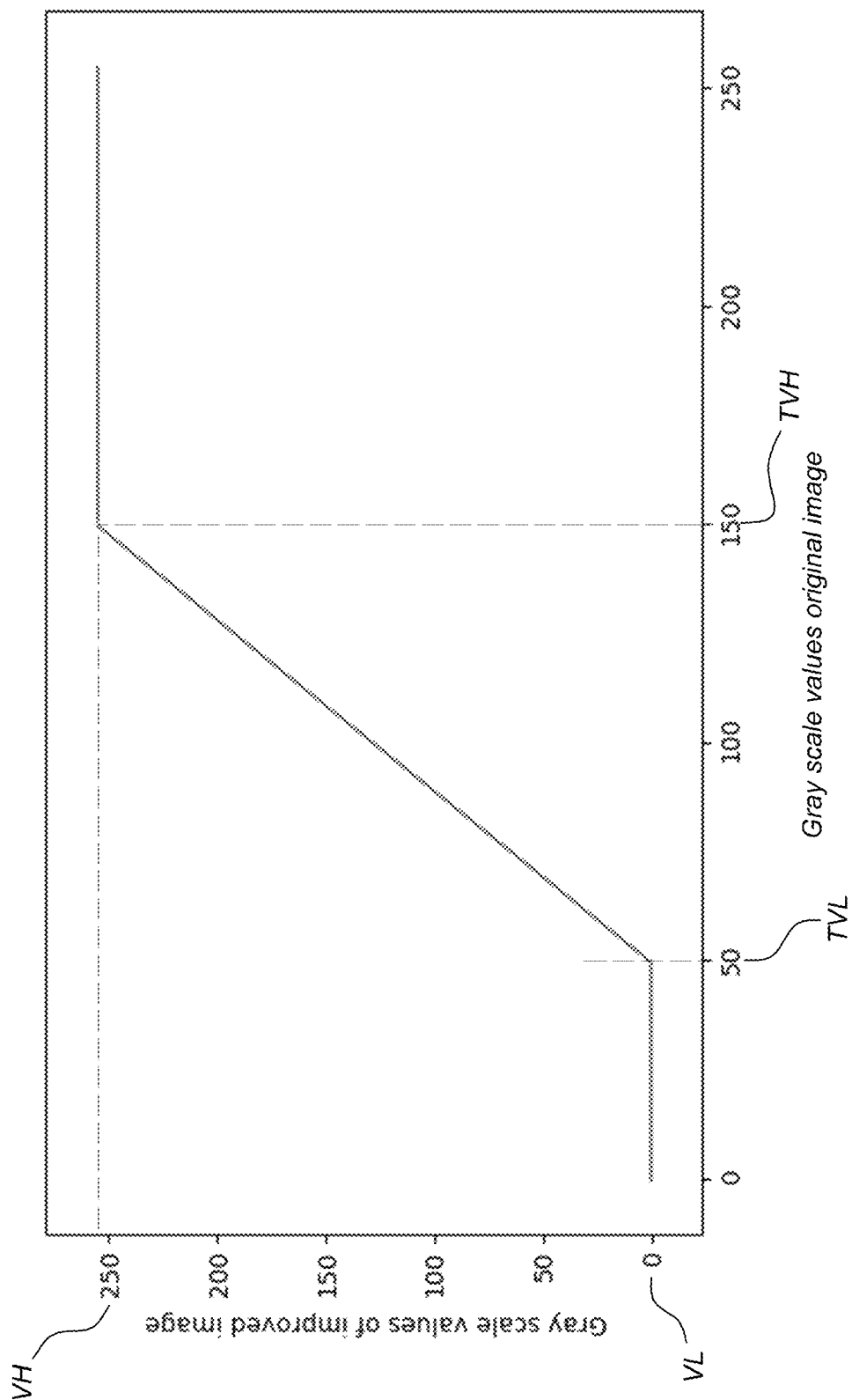
FIG. 9 shows a mapping of grey scale values for improving contrast of a scanned image according to an embodiment of the present invention.

This pre-processing step of the image may be further explained by referring to FIG. 7, which shows a magnified portion of a scanned image of the pattern 1. FIG. 8 shows a magnified portion of a contrast modified scanned image of the image of FIG. 7. FIG. 9 shows a mapping function for grey scales values for improving contrast of a scanned image according to an embodiment of the present invention.

To transform an original scanned image, as depicted in FIG. 7, to a contrast modified scanned image as shown in FIG. 8, an embodiment is provided wherein grey scale values of the original scanned image are mapped to new grey scale values according to some function, thereby obtaining the contrast modified scanned image of FIG. 8. Such mapping may involve rounding grey scale values upward or downward to reduce the number of different grey scale values. Such a reduction of grey scale values would enhance the definition of the edge E as the modified transient zone Z2 comprises fewer grey scale values.

It is noted that a grey scale value considered here are associated with a single pixel in the scanned image. So, for simplicity, when referring to a grey scale value than this implies a grey scale value of a pixel in the scanned image.

In view of FIG. 9, an embodiment of the method may be provided wherein the step of increasing contrast of the scanned image comprises the step of selecting a lower threshold grey scale value, $TV_L$, and a higher threshold grey scale value, $TV_H$, from all grey scale values in the scanned image;

mapping all grey scale values that are equal to or smaller than the lower threshold grey scale value, $TV_L$, to a lowest grey scale value, $V_L$; and then mapping all grey scale values equal to or larger than the higher threshold grey scale value, $TV_H$, to a highest grey scale value, $V_H$.

In this embodiment a lowest range of grey scale values are set to a fixed lowest single value, i.e. the lowest grey scale value $V_L$. As shown, all grey scale values below 50 are simply rounded down to the value 0, so this may be viewed as a rounding down operation of the grey scale values below the lowest threshold grey scale value, $TV_L$.

A highest range of grey scale values are then set to a fixed highest single value, i.e. the highest grey scale value, $V_H$. As shown, all grey scale values above 150 rounded up to the value 250, so this may be viewed as a rounding up operation or all of the grey scale values above the highest threshold grey scale value, $TV_H$.

Through the above embodiment the noise, i.e. the irrelevant data, is considerably reduced so that there will be a clearer definition of patterns and background.

It is worth noting that the pattern 1 may be represented in a scanned image by dark lines on a lighter background or by lighter lines on a dark background. So as shown in FIGS. 7 and 8, the pattern 1 is in these embodiments represented as black lines on a white background. The grey scale values below the lowest threshold grey scale value $TV_L$ may then be considered as "black" wherein the grey scale values above the highest threshold grey scale value $TV_H$ may be seen as "white".

Even though the pattern 1 is depicted as black on white for keeping the figures easier to read, in real applications it may be advantageous to deposit the pattern 1 as one or more light coloured lines on a darker coloured support 2. That is, in a preferred embodiment the step of a) depositing the pattern 1 of one or more lines on the support 2 comprises depositing the pattern 1 in a lighter colour than a colour of the support 2. Doing so minimizes reflection of light coming from the imaging device by reduced gloss of the lighter coloured pattern 1. Furthermore, a darker coloured support 2 prevents formation of shadows by the pattern 1 on the support 2. In an exemplary embodiment the pattern 1 may be deposited using a white or silver coloured filament material on a substantially black support 2, thereby minimizing gloss of the pattern 1 and the formation of shadows by the pattern 1 on the support 2.

Further steps for improving contrast of the scanned image are conceivable. For example, in an embodiment the step of increasing contrast of the scanned image further comprises the step of mapping all grey scale values between the lower threshold grey scale value, $TV_L$, and the higher threshold grey scale value, $TV_H$, according to a linear map with a non-zero gradient. In this embodiment a mapping as depicted in FIG. 9 is used, e.g. a linear map between $TV_L$ and $TV_H$. Such a map may improve distribution of grey scale value by "pulling" and "pushing" grey scale values downward and upward, respectively, from their original values for improving contrast of the scanned image. In alternative embodiments a non-linear map may considered for improving contrast of the scanned image of the pattern 1.

From FIG. 8 line widths, distances and angles between lines can accurately be determined. In an embodiment, a line width of a pattern line at a certain location is determined by defining a center line of the pattern line, drawing a perpendicular line (a line perpendicular to the center line) at the certain location and defining a graph of the grey scale values of the pixels along the perpendicular line. That graph will be a stepped function because of concrete grey scales of the pixels along the perpendicular line. Now curve fitting can be applied to get a smooth line across the stepped function. This smooth function, together with a predefined background grey scale level, can be used to determine the line width. In this way the line width of a deposited line can be determined on a subpixel level which is more accurate than on pixel level.

The imaging device for use in the method of the present invention may exhibit scanning errors, inaccuracies, inconsistencies and the like, which in many cases occurs when inexpensive imaging devices (e.g. cameras) are used. These scanning errors may be introduced by optics and electronics of limited quality. Also, imaging devices may still use movable parts and mechanisms exhibiting mechanical tolerances, misalignments, offsets etc.

According to the present invention, the method should not rely on using high-end imaging devices to achieve a desired level of scanning accuracy and consistency. So, for situations where e.g. an optical scanner provides limited scanning quality, there is a need for dealing with scanning inaccuracies effectively to obtain an accurate representation of the pattern 1 in the scanned image thereof.

Figure 10:
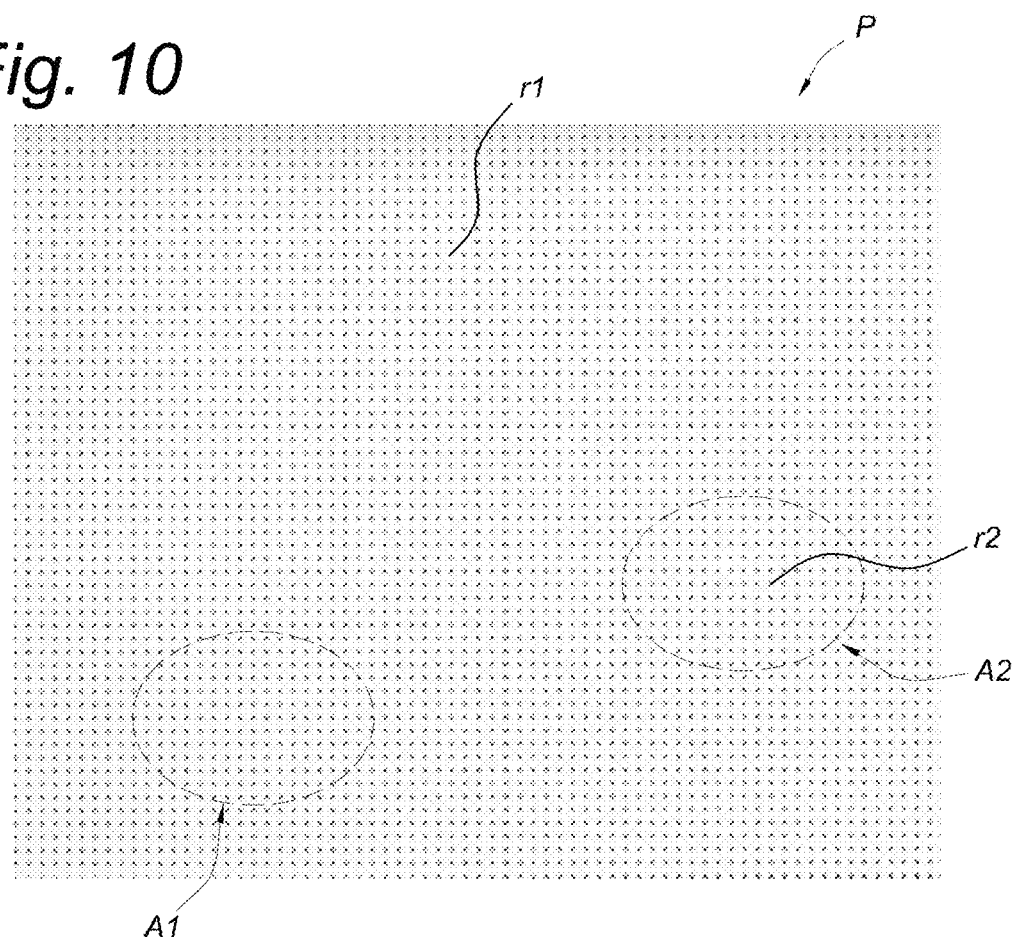
FIG. 10 shows a reference pattern according to an embodiment of the present invention.
Figure 11:
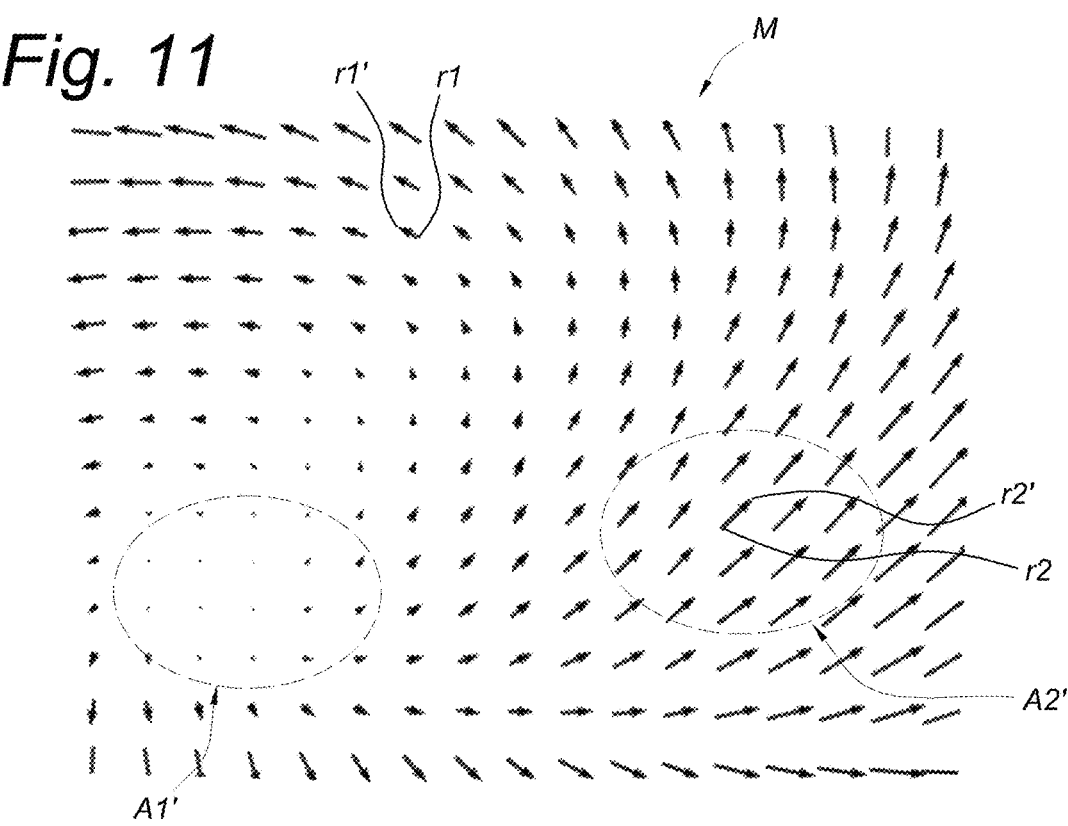

An advantageous technique for dealing with imaging inaccuracies is depicted in FIGS. 10 and 11, wherein FIG. 10 shows an example of a reference pattern P to be scanned by the imaging device, and wherein FIG. 11 shows an example of an imaging error map M identifying scanning errors introduced in the scanned reference pattern.

Based on FIGS. 10 and 11, an embodiment is provided wherein the step of b) further comprises making an image of a reference pattern P using the imaging device to produce a reference image, i.e. an image obtained from the reference pattern, and determining an imaging error map M between the reference pattern and the reference image.

The method then continues by compensating the scanned image of the pattern 1 for scanning errors based on the imaging error map.

This embodiment allows quick and accurate determination of scanning errors being introduced into images by the imaging device. The imaging error map obtained may be viewed as a difference between the reference pattern P and the scanned reference pattern.

In the embodiment of FIG. 10, the reference pattern P may comprise a plurality of reference features r1, r2, e.g. a regular arrangement of dots r1, r2. By making an image of the reference pattern P, an imaging error map M may be generated to identify positional shift/drift of the plurality of reference features r1, r2. As shown in FIG. 11, the imaging error map M may be viewed as a vector field showing original positions of the plurality of reference feature r1, r2 in the reference pattern P that was scanned, and further showing shifted positions of each of the plurality of shifted reference features r1', r2' in the scanned reference image. Therefore, the imaging error map M may be seen as the original reference pattern P being overlaid by the scanned reference image.

It is worth noting that the imaging error map M obtained by the method need not show a uniform distribution of errors introduced into scanned images. As depicted in FIGS. 10 and 11, there may be an area A1 of the reference pattern P that remains by and large the same as a corresponding scanned area A1' as shown in the imaging error map M. However, another area A2 of the reference pattern P may be significantly more distorted as a corresponding scanned area A2' in the imaging error map M.

According to the present invention, the method may be performed by a person operating the FFF printer and the imaging device, wherein the support 2 with the pattern 1 may be removed from the FFF printer and subsequently arranged on or in front of the imaging device, e.g. a flatbed optical scanner. The image generated by the imaging device may then be copied manually or automatically onto a computer system comprising a processing unit 25 configured for analysing one or more geometric features of the pattern 1 in the image and determining the one or more printer properties of the FFF printer based the one or more geometric features.

Figure 12:
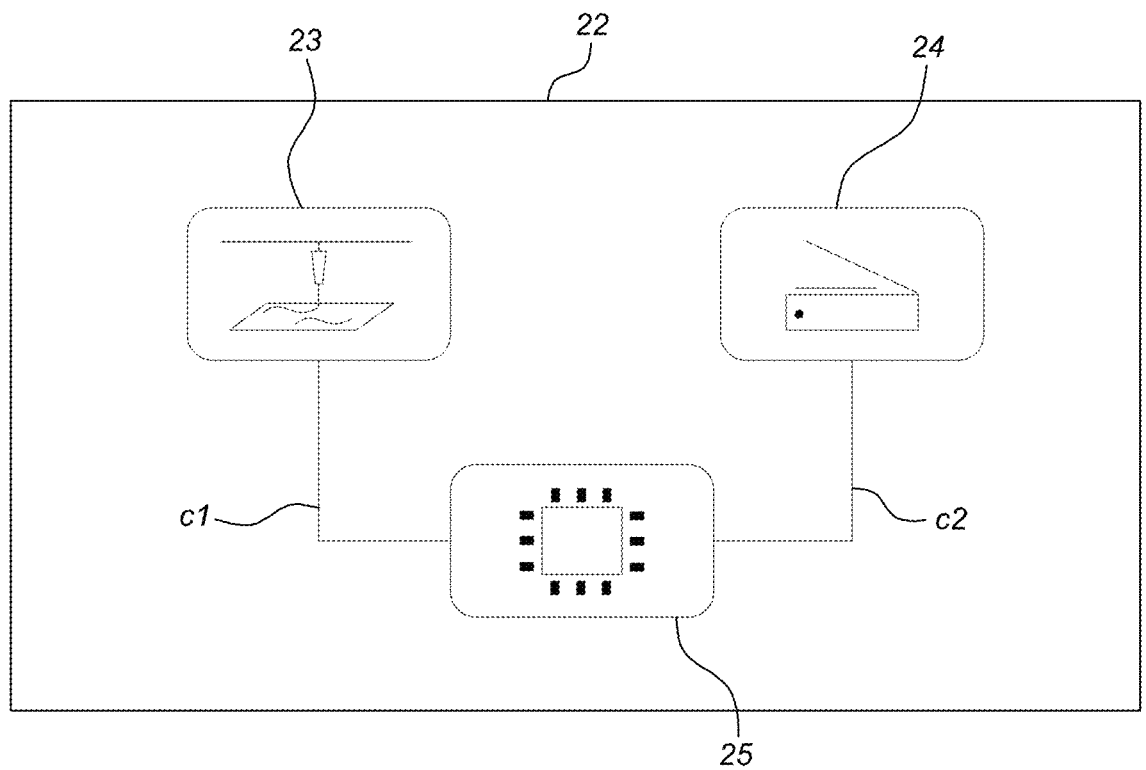
FIG. 12 shows a system for determining one or more printer properties of an FFF printer according to an embodiment of the present invention.

However, it is also conceivable that the method can be automated by a system as shown in FIG. 12. In the embodiment shown, a system 22 may comprise an FFF printer 23, an imaging device 24, and a processing unit 25 communicatively connected to the FFF printer 23 and the imaging device 24 (e.g. flatbed scanner, camera, webcam etc.) through communication channels c1, c2. The processing unit 25 may also be configured to control the FFF printer 23 to deposit a pattern 1 of one or more lines on a support 2 of the FFF printer.

The processing unit 25 may be configured to control the imaging device 24 to make an image of the deposited pattern 1 on the support 2. Furthermore, the processing unit 25 may be configured to:
  receive an image of a pattern of one or more lines made by the FFF printer;
  analyse one or more geometric features of the pattern 1 in the image; and to
  determine the one or more printer properties of the FFF printer based the one or more geometric features.

The system 22 mentioned above allows for efficient and targeted analysis of various printer characteristics such as printer dynamics, orthogonality of printer axes, scaling and offset errors in various print directions, as well as hysteresis phenomena. The system 22 can therefore be used to facilitate comprehensive analysis of printer characteristics and behaviour for the purpose of quality control and calibration of FFF printers.

The present invention has been described above with reference to a number of exemplary embodiments as shown in the drawings. Modifications and alternative implementations of some parts or elements are possible and are included in the scope of protection as defined in the appended claims.

The invention claimed is:

1. A method of determining one or more printer properties of a fused filament fabrication (FFF) printer, comprising the steps of:
   a) depositing a pattern of one or more lines on a support using the FFF printer;
   b) making an image of the deposited pattern on the support using an imaging device;
   c) analyzing one or more geometric features of the pattern in the image; and
   d) determining the one or more printer properties of the FFF printer based the one or more geometric features,
   wherein the depositing of step a) comprises depositing a first line and a subsequent second line at an angle ($\gamma$) between 0° and 180° degrees to the first line;
   wherein the analyzing of step c) comprises:
      localizing perturbations at the beginning of the second line,
      determining a center line of the perturbations; and
      determining line width variations of the perturbations; and
   wherein the determining of step d) comprises determining dynamic properties in X and Y print directions based on an oscillation of the center line and the line width variations.

2. The method according to claim 1, wherein the step of d) determining the one or more printer properties comprises determining one or more of:
   orthogonality of X and Y print axes;
   scaling errors in X and Y print directions;
   dynamic properties of the FFF printer in X, Y and Z print directions;
   X and Y offset error between a plurality of print nozzles of the FFF printer; and
   hysteresis of print head movements.

3. The method according to claim 1, wherein the depositing of step a) further comprises:
   depositing a first, a second and a third line pattern, wherein the first and second line patterns are spaced apart in a Y direction, wherein the second and the third line patterns are spaced apart in an X direction, and wherein the first and the third line patterns are spaced apart in the Y and X direction,
   wherein the analyzing of step c) comprises determining a first straight line extending between geometric centers of the first and the second line patterns, and a second straight line extending between geometric centers of the second and the third line pattern; and
   wherein the determining step d) comprises determining orthogonality of X and Y printer axes and/or scaling errors in X and Y print directions based on the first and second straight line.

4. The method according to claim 3, wherein the first, second and third line patterns each comprise one or more circles and/or polygons.

5. The method according to claim 3, wherein the first, second and third line patterns each comprise an array arrangement of spaced apart circles and/or polygons.

6. The method according to claim 1, wherein the depositing of step a) comprises depositing a first set of two spaced apart parallel lines and a second set of two spaced apart parallel lines, wherein the first set of lines and the second set of lines are at an angle $\alpha$ between 0° and 90° with respect to each other and wherein the first set of lines are at an angle $\beta$ between 0° and 90° with respect to the X axis, and
   wherein the analyzing of step c) comprises:
      determining a local distance error (e1) between the first set of parallel lines, the local distance error (e1) being a function of print length 1 along a print line, wherein:
      $(d1_{meas}(l))-d1_{target}=e1(l)$, wherein $d1_{meas}(l)$ is a measured local distance between the first set of parallel lines, and $d1_{target}$ a targeted distance between the first set of parallel lines, and
      determining a local distance error (e1) between the second set of parallel lines, the local distance error (e2) being a function of print length 1 along a print line, wherein:
      $(d2_{meas}(l))-d2_{target}=e2(l)$, wherein $d2_{meas}(l)$ is a measured local distance between the second set of parallel lines, and $d2_{target}$ a targeted distance between the second set of parallel lines; and
   wherein the determining of step d) comprises: determining hysteresis of print head movements based on a function of the first and second local distance errors (e1, e2).

7. The method according to claim 1, wherein the step of a) depositing the of step a) further comprises:
   depositing a first circle with a first nozzle and a second circle with a second nozzle, the second circle being larger than the first circle and concentric to the first circle;
   wherein the analyzing of step c) comprises analyzing first and second center points of the first and second circles respectively; and
   wherein the determining of step d) comprises determining an X and Y offset error between the first and the second nozzle based on the first and second center points.

8. The method according to claim 1, wherein the depositing of step a) further comprises depositing a first polygon with a first nozzle and a second polygon with a second nozzle, the second polygon being larger than the first polygon as well as being concentric thereto;
   wherein the analyzing of step c) then comprises identifying first and second center points of the first and second polygon respectively; and
   wherein the determining of step d) then comprises determining an X and Y offset error between the first and the second nozzle based on the first and second centre-center points.

9. The method according to claim 1, wherein the depositing of step a) further comprises depositing a sequence of lines along an edge of the support representing a bar code.

10. The method according to claim 1, further comprising increasing contrast of the image prior to the step of analyzing the one or more geometric features.

11. The method according to claim 10, wherein the step of increasing contrast of the image comprises:
   selecting a lower threshold grey scale value, and a higher threshold grey scale value from all grey scale values in the image;
   mapping all grey scale values that are equal to or smaller than the lower threshold grey scale value to a lowest grey scale value; and mapping all grey scale values equal to or larger than the higher threshold grey scale value to a highest grey scale value.

12. The method according to claim 11, wherein the step of increasing contrast of the image further comprises:

mapping all grey scale values between the lower threshold grey scale value and the higher threshold grey scale value according to a linear map with a non-zero gradient.

13. The method according to claim 1, wherein making the image of step b) comprises:

making an image of a reference pattern using the imaging device to produce a reference image, and determining an imaging error map between the reference pattern and the reference image, and compensating the image of the pattern for imaging errors based on the imaging error map.

14. The method according to claim 1, wherein the depositing of step a) comprises depositing the pattern in a lighter color than a color of the support.

15. The method according to claim 1, wherein the pattern is a single layer pattern.

16. A system for determining one or more printer properties of a fused filament fabrication (FFF) printer, the system comprising:

a processing unit, an FFF printer, and an imaging device communicatively connected to the processing unit through communication channels, wherein the FFF printer is adapted to deposit a pattern of one or more lines on a support of the FFF printer, the pattern comprising a first line and a subsequent second line at an angle ($\gamma$) between 0° and 180° degrees to the first line, wherein the processing unit is configured to:
control the imaging device to make an image of the deposited pattern on the support;
receive the image of the deposited pattern;
localize perturbations at a beginning of the second line;
determine a center line of the perturbations;
determine line width variations of the perturbations, and
determine dynamic properties in X and Y print directions based on an oscillation of the center line and the line width variations.

* * * * *